Figure 4:
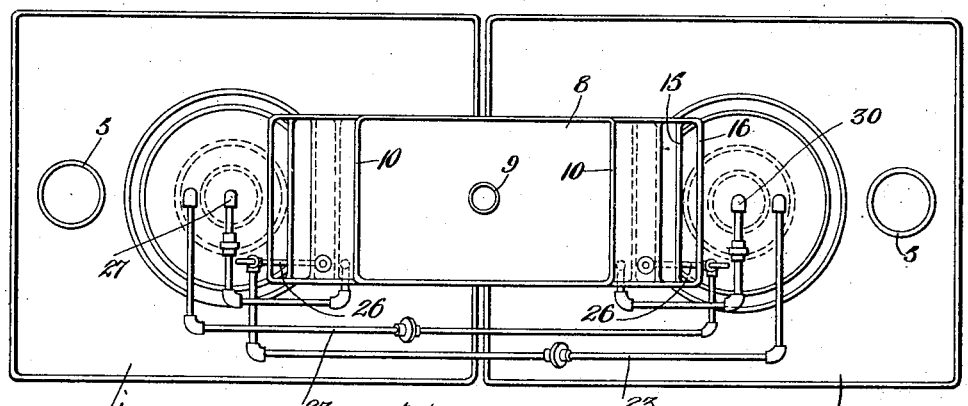

Jan. 7, 1930.  C. S. BROWN  1,742,846
FLOW CONTROLLING DEVICE
Filed Sept. 4, 1920  3 Sheets-Sheet 1

Inventor
Charles S. Brown
By Kenyon & Kenyon
his Attorneys

Jan. 7, 1930.  C. S. BROWN  1,742,846
FLOW CONTROLLING DEVICE
Filed Sept. 4, 1920  3 Sheets-Sheet 2

INVENTOR
Charles S. Brown,
BY
Kenyon & Kenyon
his ATTORNEYS

Jan. 7, 1930.  C. S. BROWN  1,742,846
FLOW CONTROLLING DEVICE
Filed Sept. 4, 1920   3 Sheets-Sheet 3

Inventor
Charles S. Brown
By Kenyon & Kenyon
his Attorneys

Patented Jan. 7, 1930

1,742,846

UNITED STATES PATENT OFFICE

CHARLES S. BROWN, OF NASHVILLE, TENNESSEE; CHARLES H. SIMPSON, EXECUTOR OF SAID CHARLES S. BROWN, DECEASED, ASSIGNOR TO CHARLES H. SIMPSON, DAN E. McGUGIN, AND CHARLES C. TRABUE, TRUSTEES

FLOW-CONTROLLING DEVICE

Application filed September 4, 1920. Serial No. 408,247.

My invention relates to flow controlling devices and particularly to devices for volumetric measurement of liquids.

An object of my invention is to provide a device for metering liquids which will be accurate and simple and in which there will be no moving parts.

Another object of my invention is to provide a metering device for liquids which is entirely automatic in operation.

Another object of my invention is to provide a metering device comprising a plurality of tanks for which there is a source of liquid supply and which is provided with means for automatically releasing and discontinuing the liquid supply to the individual tanks.

Another object of my invention is to provide a metering device for liquids which comprises a plurality of tanks and which is provided with means acting upon the rise of liquid level in one of the tanks to release a liquid supply to another tank, a further object being to provide means for discontinuing the liquid supply to a given tank when the liquid level therein attains the given point.

Another object of my invention is to provide metering devices for liquids comprising a tank having an outlet provided with an air chamber and having means operated by air from said chamber for the releasing and discontinuing of the flow of liquid from the source of supply to the tank.

Another object of my invention is to provide a metering device for liquids comprising a plurality of tanks and including means for alternately releasing a source of supply to one tank and discontinuing a source of supply to the other tank so that one tank may be drained while the other is being filled.

Another object of my invention is to provide a metering device for liquids comprising a plurality of tanks the source of supply to which is controlled by air from air chambers in outlets of the tanks and also by the dynamic force of liquid in the tanks.

Another object of my invention is to provide a metering device for liquids comprising a plurality of tanks having inlets which may be air locked and outlets which may be air locked in which the air locks of the inlets are controlled by means of the air from the air locks of the outlets, a further object being to discontinue the supply to a given tank and release the supply to another tank by the action of air from the outlet of the given tank.

A further object of my invention is to provide a device embodying any of the other objects of my invention in which the admission of air to the air chamber of the outlet and its withdrawal therefrom for the purposes stated also control the tank outlet.

Other and further objects of my invention will appear from the following description taken in conjunction with the accompanying drawings forming a part of this specification and will be pointed out in the hereunto appended claims.

Figure 1:
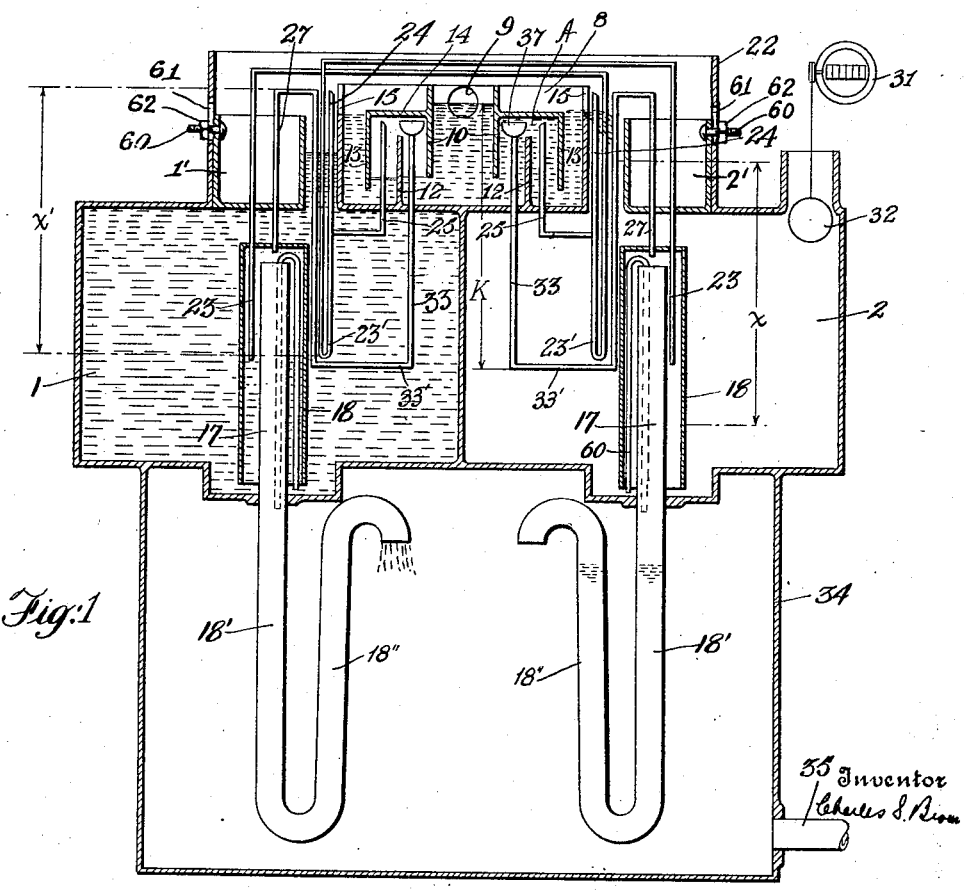
Figure 2:
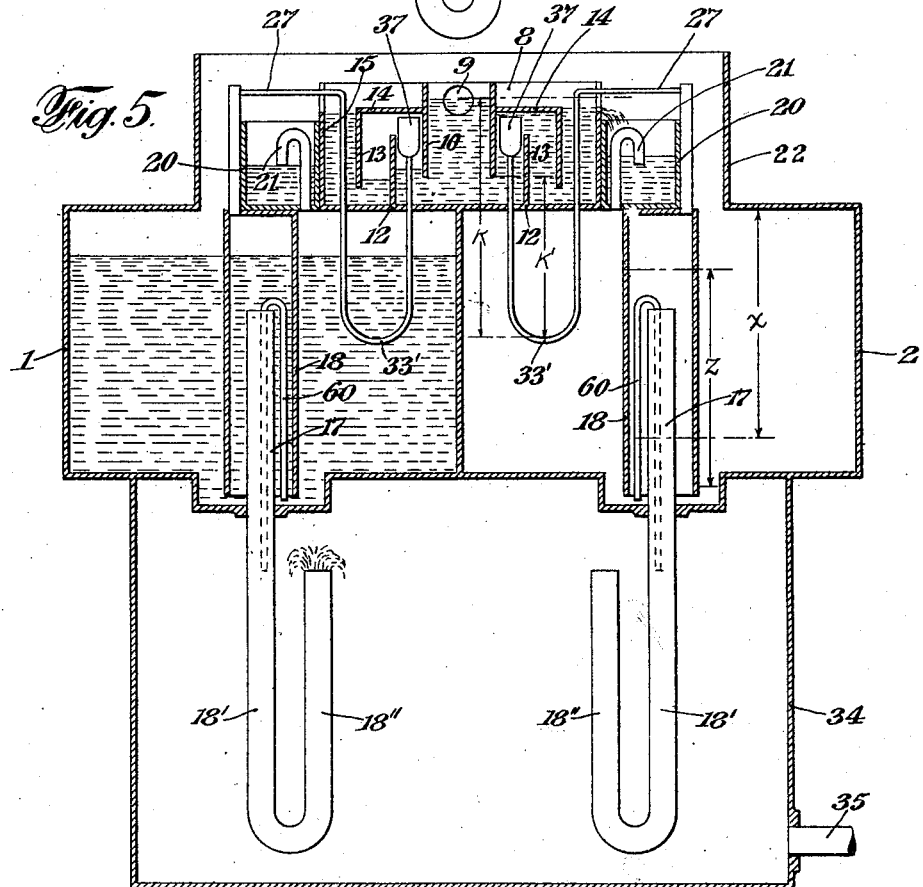
Figure 3:
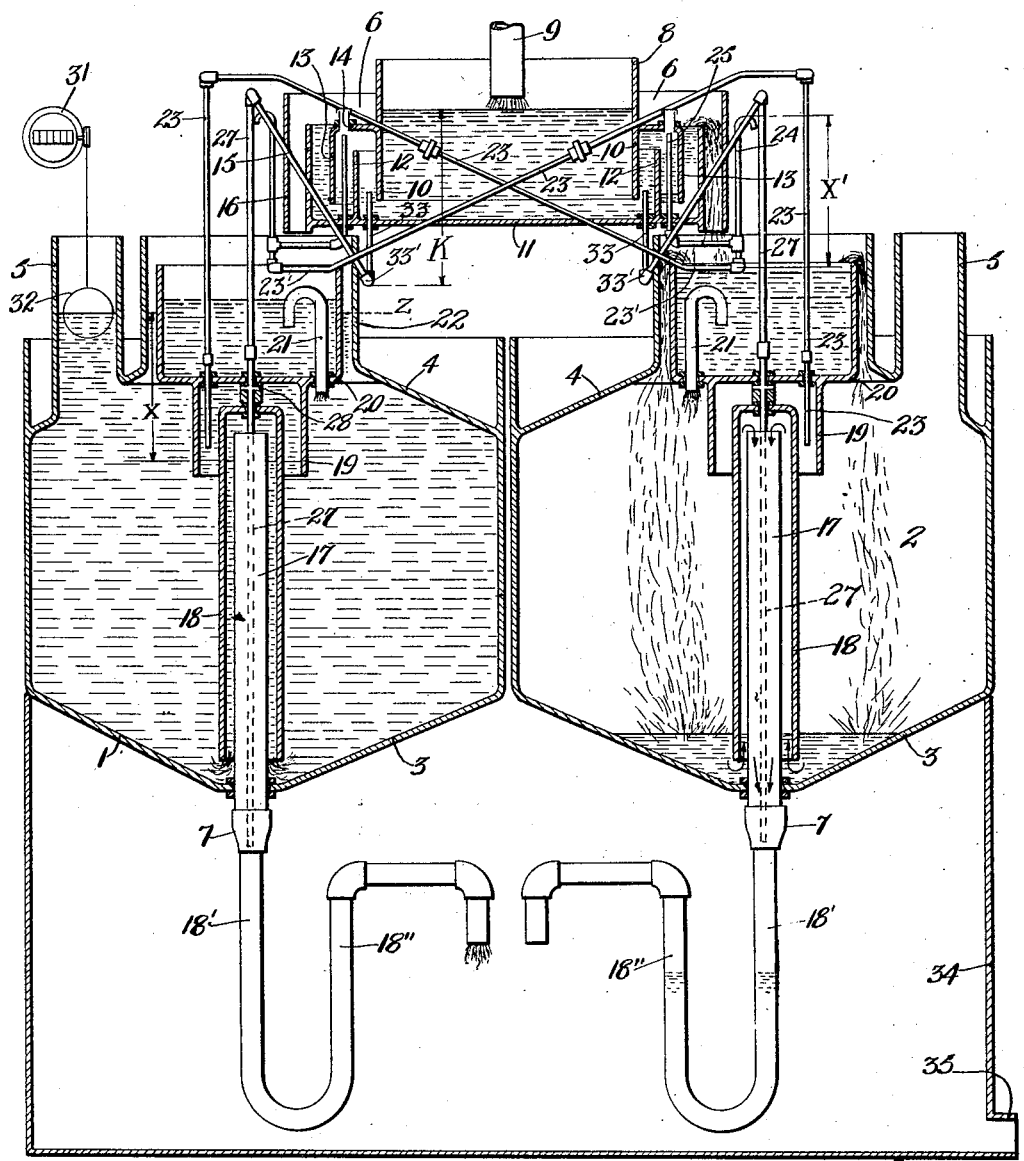

In the drawings in which like characters indicate similar parts, Figure 1 is a vertical sectional view of a metering device embodying my invention. Figure 2 is a vertical, sectional view of a modification of a detail which may be substituted in the device shown in Figure 1. Figure 3 is a vertical, sectional view of a modified device embodying my invention. Figure 4 is a top plan view of the device shown in Figure 3. Figure 5 is a vertical section of a simplified modification.

Referring to Figure 1 for the purpose of describing the general features of my invention, it will be seen that there are two tanks, 1 and 2, which, for the purpose of metering liquids, may be of known content; and the content of these tanks may be altered by adjusting upwardly and downwardly the displacing members 1' and 2', such adjustment being provided for in any manner as by the bolts 60 moving with members 1' and 2' and passing through slots 61 in the upward extension 22 of the tanks 1 and 2, the members 1' and 2' being clamped in desired position by nuts 62. The source of supply for the tanks 1 and 2 is the inlet opening 9 and the final outlet is the pipe 35 leading from the casing 34 into which the tanks discharge as hereinafter described. In order that the amount of liquid flowing out of the pipe 35 may be known, the tanks 1 and 2 are alternately filled and drained and a float 32 which actuates a counter 31 is provided to keep tally of the number of times the tanks are filled. In order to effect the alternate filling and draining of the tanks, I provide means for controlling the flow of liquid from the source 9 to each of the tanks. This means consists of a circuitous passage including the chamber A which is made up by inserting in the tank 8 the partition 10 which extends from the top to a point short of the bottom thereof, the partition 12 which extends from the bottom of the tank 8 upwardly to a point short of the horizontal partition 14 from which horizontal partition there extends downwardly a partition 13. Each side of the tank 8 is notched out at 15 to permit the flow of liquid into the respective tanks, 1 and 2. It will thus be seen that a circuitous upward and downward passage is provided from the inlet 9 out through the notch 15 into each of the metering tanks. In order to release the source of supply and start the flow of liquid into one of the tanks, air is permitted to escape from the chamber A through the pipes 24 and 25, and in order to discontinue the source of supply to one of the tanks air is forced into the chamber A through the pipe 33, all as hereinafter described.

In order to control the discharge of each of the metering tanks I provide means which will prevent outflow therefrom until the liquid therein has reached a predetermined level. This means includes a pipe 17 extending upwardly into the tanks 1 and 2 and provided with the downward extension 18′ and an upward extension 18″. Fitting freely over and spaced from each of the pipes 17 is a bell 18 which is open at the bottom and closed at the top except for the passage therethrough, of small pipes hereinafter described.

When the air has been permitted to escape from the chamber A leading to the tank 2 as shown in the righthand side of Figure 1, liquid coming in at the passage 9 will flow through the circuitous passage formed by the partitions 10, 12, 13 and 14 and the end wall of the tank 8 outwardly through the notch 15 and into tank 2. The liquid level will then rise in the tank 2 until it closes the bottom of the bell 18 therein but the air is confined in this bell 18 and in the pipe 17 because the last previous operation has left the loop of pipe formed by the pipes 18′ and 18″ partly filled with liquid; and the pipe 23 leading from the bell 18 through the loop 23′ and dividing into the branches 24 and 25 is also closed by the presence of liquid in the loop 23′ which collected during the time when the liquid was flowing into the tank 1. And furthermore the pipe 27 leading from the top of the bell 18 through the loop 33′ to the pipe 33 which opens between the partitions 10 and 12 is sealed by the liquid in the loop 33′. As the level rises in the tank 2 it will be seen therefore, that the head of liquid acting upon the air in bell 18 will increase and when the head of liquid X is equal to or greater than the head of liquid X′ the air confined in the bell 18 will pass through the pipe 23 and blow out of the loop 23′ the liquid contained therein and part of the liquid contained in the pipes 24 and 25. If there is any liquid remaining in the pipes 24 and 25 this will flow back into the loop 23′ and leave unobstructed, the pipes 24 and 25 so that the air in chamber A at the left of Figure 1 will escape and the source of supply will be released to tank 1 so that the liquid will flow from the pipe 9 through the circuitous passage at the left side of the tank 8 into the said tank 1. The liquid continues to flow into tank 2. It is also to be noted that some air has escaped from the bell 18 during the blowing out of the seal 23′ at the left of tank 8 and during the time the liquid is rising in bell 18 to seal the lower end of pipe 23. This escape of air permits a rise of liquid in bell 18 with a consequent fall of liquid in tank 2 so that the liquid acquires a dynamic force which acts with the liquid head X and compresses the air in the bell 18 until its pressure may be great enough when transmitted through the pipe 27 to the loop 33′ to blow out of that loop or trap the liquid which previously sealed it and force air into the chamber A at the right side of tank 8, thus air-locking and discontinuing the source of supply into the tank 2.

Thus it will be seen that the rise of liquid in tank 2 released the source of supply into the tank 1 and discontinued the source of supply into tank 2 and that this operation has been brought about by the air contained in the discharge passage of the tank 2 and that the dynamic force in the liquid in said tank may also be utilized. Now that the air has been released from the bell 18 in tank 2, the liquid will rise outside of the pipe 17 and flow into the top thereof and out through the pipes 18′ and 18″ so that a siphon action is initiated and this siphon action will continue until the level in tank 2 drops below the bell 18, whereupon air will bubble up into bell 18 breaking the siphon and the liquid contained in the bell 18 will drop down into the bottom of the tank 2. In order to discharge this residual liquid, I provide an auxiliary siphon 60, adapted to discharge practically all the liquid from the tank 2 after the main siphon discharge is no longer operative, insuring thorough sealing of the outlet.

Instead of providing siphon tube 60 the bell 18 may be made as shown in Figure 2 and the discharge pipe 17 may have outside of it pipe 61 and inside of it pipe 62 joined together at the top by the curved portion 63 so that the discharge passage 64 and 65 will form a siphon leading to the pipe 18′. Such a construction would carry away practically all of the liquid which settles down into the bottom of the tank after the air starts to bubble under the edge of the bell 18. It is also to be noted that pipe 62 provides an air passage from the outlet pipes to the interior of the bell 18 from which the air escapes by the pipes 23 and 27 as above described and for the purposes stated.

During the draining of the tank 2, tank 1 has been filling up and when it is full, the supply to it will be discontinued by the action of the air trapped in the bell 18 and the discharge pipe 17, as previously described in connection with the operation effected by the rise of the liquid in tank 2.

It is to be noted that the partition 13 is longer than the partition 10 so that any excess of air supplied to the chamber A will bubble under partition 10 instead of throwing out the liquid between the partition 13 and the end wall of the tank 8 which might result in preventing formation of an air lock in chamber A if the head of liquid above the lower edge of the partition 13 was so reduced as to be less than the head of liquid above the lower edge of partition 10.

It is also to be noted that the length of the loop 23' can be so proportioned as to effect the releasing of the supply to another tank when the level in a given tank reaches a predetermined point.

It will be obvious from the above description that the air which locks the discharge is used for locking and unlocking the inlet or discontinuing and releasing the source of supply to the different tanks and that the air in the discharge passage of one tank unlocks the inlet to another tank and later or simultaneously locks the inlet to the first tank.

There may be a small interval of time from the releasing of the flow into tank 1 and the discontinuing of the flow into tank 2 until the beginning of the discharge from tank 2 for two reasons. First, because the head of liquid in tank 2 falls slightly in filling up that portion of the discharge siphon head or bell 18 which has been emptied of air in the action of starting the flow into tank 1, and second, because the seal in loop 33' may have a higher head than the seal in loop 23'. During the period in which the liquid level is again rising in tank 1 the supply may be flowing into both tanks but this interval may be made as small as desirable by careful adjustment of the heads of the liquid seals in loops 23' and 33', and by taking advantage of the dynamic force of the liquid in the tank 2 which it acquires when it drops in tank 2 and rises within the bell 18 after some of the air has passed out of bell 18 through the pipe 23 to unlock the source of supply to tank 1.

It will be apparent that the head of liquid sealing the loops 23' and 33' and 18' will be dependent also upon the height of head above the lower edge of the bell 18 of the discharge siphon head. The seal in the loop 18' must have a great enough head to withstand the greatest pressure which is necessary within the discharge siphon head, namely, the pressure necessary to blow the liquid out of the loop 33' and fill the chamber A with air to lock the liquid inlet to one of the tanks. When a bell of lesser height such as shown in Figure 2 is used, the discharge loop 18' must have a great enough sealing head to retain the air in the more deeply submerged bell 18 and the loop 33' will have to be proportionately longer.

After the air under pressure in bell 18 has blown the liquid seal out of loop 33' and filled a chamber A with air to discontinue the supply to one of the tanks it is necessary that the loop 33' be re-filled with liquid to prevent the air from escaping from chamber A or being withdrawn prematurely by the vacuum formed in bell 18 as the liquid head drops in the tank. This may be accomplished by expanding the top of pipe 33 out into a cup 37 or by positioning the end of pipe 33 below the minimum liquid level between partitions 10 and 12 as shown in Figure 3, hereinafter described. Air will force the liquid up into cup 37 and bubble up through it without throwing it out and the liquid will then run back into loop 33' and seal it.

In the device shown in Figures 3 and 4 the same general construction and operation is found with certain modifications: The pipe 27 is provided with an auxiliary opening 28 so that the liquid will rise within the bell 18 and on the outside of the pipe 17 until the level reaches the lower end of a larger bell 19 which surrounds the upper end of the discharge siphon formed by the pipe 17 and the bell 18. This bell 19 also surrounds the auxiliary opening 28. When the liquid reaches the lower edge of the bell 19, air is trapped therein because the seal in the loop 23' prevents escape through the pipe 23, the seal in loop 33' prevents escape through the pipe 27 and the seal in the discharge pipe 18 prevents escape through the pipe 17. When the head X equals or exceeds the head X' the seal in loop 23' will be blown out and the escape of air from the chamber A permitted as above described for the purposes stated. The air will escape until the level reaches the lower end of the pipe 23 and seals it. The liquid thus rises in the bell 19 and drops in the tank 2 so that the dynamic force of the liquid assists the pressure within the bell 19 which is increasing as the level rises in the tank 2 to blow out the seal in the loop 33' for the purposes above stated. The bell 19 seals the upper end of the discharge siphon preventing the entrance of air through the opening 28 and the discharge siphon begins to operate. When the level drops down below the edge of the bell 19 the air would enter the opening 28 and pass into the top of the discharge head but the pipe 27 is extended down to a point below the level of the lower edge of the bell 18 and is water-sealed and therefore no air will pass through the opening 28 to break the discharge siphon. The portion of pipe 27 containing openings 28 may be omitted and the bell 18 otherwise supported, for example as shown in Figure 2.

The tanks 1 and 2 may be made with conical ends as shown in Figure 3 so that slight changes in contents will produce great changes in head. In addition the upper ends of the tanks in the construction shown in Figures 3 and 5 have positioned within them auxiliary tanks 20 which are so large as to leave little space between them and the walls 22 of the top end of the tanks. The supply to each tank flows into these auxiliary tanks 20 and thence into the main tanks 1 and 2. In order to catch and restrain for a short period the first liquid passing out of tank 8 after the supply has been released to one of the tanks 1 or 2 so as to prevent flow of liquid into a tank before it is entirely emptied, and in order to compensate for any differences of content of the tanks 1 and 2 to secure accuracy in metering each auxiliary tank 20 is provided with a discharge siphon 21 the height of the inlet of which may be adjusted so that more or less of the liquid within the auxiliary tanks 20 will flow into the main tanks 1 and 2 after the flow from tank 8 has been discontinued and leave the auxiliary tank partly empty by the time a main tank is empty.

It will be obvious from the foregoing that I have provided a metering device in which a plurality of tanks are alternately filled and the filling of one tank effects the release of the supply to another tank and cuts off the supply to the filled tank by the action of the air in the chamber of the discharge passage and that the dynamic force in the liquid brought about by one operation of the air is utilized in another operation, and that the use, to perform these operations, of the air in an outlet passage effects an opening of that passage.

Inasmuch as my invention includes the idea of adjusting the height of head in the liquid seals in the loops 23′ and 33′ it will be apparent upon inspection of Figure 1 that opening and closing of the inlet air lock and opening the outlet air lock can all be effected by pipes 27 and 33 by proper adjustment of loop 33′. In this case the height of the liquid head in the loop 33′ is so adjusted that a rise of liquid within the tank 2, for example, will compress the air within the bell 18 and the outlet pipe 17 until the head X exceeds the head K whereupon the liquid will be blown out of the loop 33′ and air will then pass into the chamber A at the right hand end of the tank 8 and discontinue the supply to tank 2. The liquid in cup 37 runs back into the loop 33′ to seal it and prevent escape of air from chamber A by reason of the pressure of liquid in tank 8 or by reason of the vacuum formed in the bell 18 as the liquid level in the filled tank falls. The air having passed out of the bell 18 and the pipe 17 liquid will rise within the bell 18 and pass into the pipe 17 and initiate the discharge after the supply has been discontinued by the filling of the chamber A with air. As the discharge continues and the level in tank 2 drops the vacuum existing in the top of the discharge siphon formed by the bell 18 and the pipe 17 will increase and just before the tank is emptied far enough to permit air to pass under the edge of the bell 18 the vacuum will be a maximum and the length of the loop 33′ may be adjusted so that under the action of this maximum vacuum the air will be withdrawn from the chamber A and release the flow into the tank 2 when head Z exceeds head K′. The construction shown in Figure 1 may be so adjusted as to carry out this mode of operation. The pipes 23, 24 and 25 and the loop 23′ which also may be used for withdrawing air from chamber A and which are essential in securing the alternate filling and emptying of tanks 1 and 2, above described, may be dispensed with in the performance of the mode of operation of a single tank last described and in Figure 5 there is shown a device simplified by the omission of these parts. In order that the filling of tank 2 may not commence before the discharge is complete, an intermediate tank 20 is positioned between the tank 8 and the tank 2 which will catch and hold the first flow from the tank 8 because it has been partly emptied during the discharging of tank 2 by means of the siphon 21 as above described. In the construction shown in Figure 5 and above described, only a single tank is necessary but any number of tanks may be supplied from supply tank 8 and any number of tanks may discharge into a common discharge tank 34.

While I have described my invention in connection with specific embodiments thereof, it is to be understood that I am not limited to the particular constructions described but that my invention is defined by the claims appended hereto.

Having described my invention, what I claim as new and desire to secure by Letters Patent is:

1. In a device of the character described, a plurality of tanks, means for separately supplying liquid to each of said tanks, an outlet for one of said tanks and having a liquid-sealed air chamber, and means whereby the air in said chamber initiates flow from said liquid supply to another of said tanks upon the filling to a predetermined point of said tank having said chambered outlet.

2. In a device of the character described, a plurality of tanks, means for separately supplying liquid to each of said tanks, an outlet for one of said tanks and having a liquid-sealed air chamber, and means whereby the air in said chamber controls the liquid supply to a plurality of said tanks upon the filling to a predetermined point of said tank having said chambered outlet.

3. In a device of the character described, a plurality of tanks, means for separately supplying liquid to each of said tanks, an outlet for one of said tanks and having a liquid-sealed air chamber, and means whereby the air in said chamber discontinues the liquid supply to one of said tanks and releases the liquid supply to one of said tanks upon the filling to a predetermined point of said tank having said chambered outlet.

4. In a device of the character described, the combination of a plurality of tanks, means for supplying liquid to the inlet of said tanks, and inlet and an outlet for each of said tanks, a liquid-sealed air chamber in each inlet and in each outlet for controlling flow therethrough, and means whereby the air from the air chamber in the outlet of one tank may be utilized to unlock the seal of the chamber of the inlet of another tank and to lock the inlet seal of its tank.

5. In a device of the character described, the combination of two containers each having an inlet and an outlet, a liquid-sealed air chamber in each inlet and in each outlet for controlling flow therethrough, and means conducting the air from the air chamber of the outlet of each container to the air chamber of the inlet of both containers, and whereby upon the filling with liquid of either of said containers, the outlet of said container and the inlet of the other container are opened and the inlet of the filled container is closed.

6. In combination, a tank, a liquid supply including a liquid-sealed air chamber for controlling flow therefrom, a siphon outlet including a liquid-sealed air chamber for controlling flow therethrough, means for introducing air into, and withdrawing it from said chambers and means between said inlet and said tank for preventing mixture of incoming liquid with outgoing liquid if the air is drawn from said inlet chamber before discharge is complete.

7. In combination, a tank, a liquid supply including a liquid-sealed air chamber for controlling flow therefrom, a siphon outlet including a liquid-sealed air chamber for controlling flow therethrough, and a single means for transferring air from said outlet chamber to said inlet chamber and for introducing air into said outlet chamber.

8. In a device of the character described, a plurality of tanks, means for separately supplying liquid to each of said tanks, an outlet for one of said tanks, a liquid-sealed air chamber in said outlet and substantially immersed when said tank is full, and means whereby air from said chamber and dynamic force of liquid due to replacement of air in said chamber by liquid discontinues the supply to liquid to said tank having said outlet and releases the supply of liquid to another of said tanks when the liquid in said tank reaches a predetermined level.

9. In combination, a liquid container having an outlet provided with a liquid-sealed air trap for controlling flow of liquid therethrough and subject to the head of liquid in said container, a source of liquid supply, a liquid conduit leading from said supply and having an air trap to control flow of liquid therethrough, and a pipe leading from the air space of one of said traps to the air space of the other and having a liquid seal between its ends for controlling flow of air therethrough and said seal being provided with a vent and subject to the pressure of the air in said outlet air trap, whereby the air in the air trap of said passage is vented when the liquid in said container reaches a predetermined level.

10. In a device of the character described, a container having an outlet provided with a liquid-sealed air chamber controlling flow of liquid therethrough, a liquid conduit having a liquid-sealed air chamber controlling flow of liquid therethrough, a pipe having a liquid seal for controlling flow of air therethrough, and a vent leading from said pipe and normally sealed by the liquid of said liquid seal.

11. In a device of the character described, a plurality of tanks, means for separately supplying liquid to each of said tanks, an outlet for one of said tanks and having a liquid-sealed air chamber, and means whereby air in said air chamber discontinues the liquid supply to the tank having said outlet and releases the liquid supply to another of said tanks upon the filling to a predetermined point of said tank having said chambered outlet.

12. In a device of the character described, a plurality of tanks, means for separately supplying liquid to each of said tanks, an outlet for each of said tanks and having a liquid-sealed air chamber for controlling flow of liquid therethrough, and means whereby the air from said chamber of a first one of said tanks initiates flow from said liquid supply to another of said tanks when the liquid in said first one of said tanks reaches a predetermined level, and means whereby air from the air chamber of said other of said tanks discontinues the flow of said liquid supply to said other tank when the liquid in said other tank reaches a predetermined level.

13. In a device of the character described, a plurality of tanks, means for separately supplying liquid to each of said tanks, an outlet for one of said tanks and having a liquid-sealed air chamber therein for controlling flow of liquid therethrough, means for releasing air from the air chamber in said outlet and thereby unlocking the seal of the chamber of said outlet when the liquid in the tank containing said outlet reaches a predetermined level, and means whereby air so withdrawn initiates flow from said liquid supply to another of said tanks, upon the filling to a predetermined point of said tank having said chambered outlet.

14. In a device of the character described, the combination of a plurality of tanks, means for supplying liquid to the inlet of said tanks, an inlet and an outlet for each of said tanks, a liquid-sealed chamber in each inlet and in each outlet for controlling flow therethrough, means for releasing air from the air chamber in the outlet of a first one of said tanks and thereby unlocking the seal of the chamber of said outlet when the liquid in said first one of said tanks reaches a predetermined level, and means whereby air so released may be utilized to unlock the seal of the chamber of the inlet of another tank and to lock the inlet seal of said first tank of which the outlet seal is so unlocked.

15. In a device of the character decribed, the combination of a plurality of tanks, means for supplying liquid to the inlet of each of said tanks, an inlet and a siphon outlet for each of said tanks, a liquid-sealed air chamber in each inlet and in each siphon outlet for controlling flow therethrough, and means whereby the air from the air chamber in the siphon outlet of each tank may be utilized to unlock the inlet seal of another tank and to lock the inlet seal of that tank.

16. In a device of the character described, a plurality of tanks each having an inlet and an outlet, a liquid-sealed air chamber in each inlet for controlling flow therethrough, a liquid-sealed air chamber in each outlet for controlling flow therethrough and subject to the maximum head of liquid in its tank, liquid-sealed vents for said air chambers of said inlets, pipes from the air chamber of the outlet of each tank to the air chamber of the inlet thereof, and pipes from the air chamber of the outlet of each tank to the vent of another tank.

17. In a device of the character described, a plurality of tanks each having an inlet and an outlet, a liquid-sealed air chamber in each inlet for controlling flow therethrough, a liquid-sealed air chamber in each outlet for controlling flow therethrough and subject to the maximum head of liquid in its tank, liquid-sealed vents for said air chambers of said inlets, pipes having liquid-sealed traps and connecting the air chamber of the outlet of each tank to the air chamber of the inlet thereof, and pipes from the air chamber of the outlet of each tank to the liquid seal of the vent of another tank.

18. In combination, a tank, a liquid inlet therefor having a liquid-sealed air locking chamber for controlling flow of liquid therethrough, an outlet for said tank and having a liquid-sealed air chamber for controlling flow of liquid therethrough, and a pipe having a liquid seal between its ends and closed except for communication at its ends respectively with said air locking chambers.

19. In combination, a tank, a liquid conduit having an air-locking chamber to control liquid flow therethrough, an air bell in said tank and sealed by and subject to the head of liquid therein, an air pipe leading from the air space of said bell to the air space of said chamber and having a liquid seal between its ends, a vent leading from said seal at a point below the normal level of liquid therein, whereby said vent is sealed by the liquid of said seal.

20. In a device of the class described, a tank, a liquid conduit for supplying liquid to said tank and having an air-locking chamber for controlling flow of liquid therethrough, a siphon outlet having a liquid trap to prevent flow of air from said outlet, an air pipe leading from the upper part of said siphon outlet to the air space of the air-locking chamber of said supply conduit and having a liquid trap therein to control flow of air therethrough and being otherwise closed.

21. In combination, a liquid container, an outlet for said container having a liquid-sealed air chamber for controlling flow of liquid therethrough, a source of liquid supply, a liquid conduit leading from said source, and means whereby the air in said chamber initiates flow of liquid through said conduit upon the filling to a predetermined point of said container having said chambered outlet.

22. In a device of the character described, a plurality of metering tanks, liquid inlets for each tank and having air controlled opening and closing means, an air bell in each of said tanks and subject to the maximum head of liquid therein and sealed by said liquid, means whereby air from each bell may be utilized to close the inlet of its tank when liquid attains a predetermined level therein, and means whereby air from each bell may be utilized to open the inlet of another of said tanks when the liquid acting on said bell attains a predetermined level.

23. In combination, a tank, a liquid conduit having an air-locking chamber to control liquid flow therethrough, an air bell in said tank and sealed by and subject to the head of liquid therein, an air pipe leading from the air space of said bell and open at its end and having a liquid trap to control escape of air therethrough, and a vent pipe leading from the air space of said air-locking chamber to a point below the liquid level of that side of said liquid trap which is open to the atmosphere, whereby said vent is normally sealed by liquid in said liquid trap.

24. In combination, a tank, a liquid conduit having an air-locking chamber to control liquid flow therethrough, an air bell in said tank and sealed by and subject to the head of liquid therein, an air pipe leading from the air space of said bell and open at its end and having a liquid trap to control escape of air therethrough, and a vent pipe leading from the air space of said air-locking chamber to a point of said liquid trap which is below the liquid level therein, whereby said vent is normally sealed by liquid in said liquid trap.

25. In a device of the character described, the combination of a plurality of tanks, means for supplying liquid to the inlets of said tanks, an inlet and an outlet for each of said tanks, a liquid-sealed air chamber in each inlet and in each outlet for controlling flow therethrough, and means whereby the air from the air chamber in the outlet of each tank may be utilized, thereby unlocking the seal of the outlet thereof, to unlock the seal of the chamber of the inlet of another tank and to lock the inlet seal of the tank of which the outlet seal is unlocked.

26. In a device of the character described, the combination of a plurality of tanks, means for supplying liquid to the inlets of said tanks, an inlet and an outlet for each of said tanks, a liquid-sealed air chamber in each inlet and in each outlet for controlling flow therethrough, and means whereby the air from the air chamber in the outlet of each tank may be utilized to lock the seal of the chamber of the inlet of the same tank and to unlock the seal of the chamber of the inlet of another tank.

27. In a device of the character described, two metering tanks, a source of liquid supply, conduits leading from said source respectively to each of said tanks and each having a liquid-sealed air chamber therein to control flow of liquid therethrough, an outlet for each of said tanks and having a liquid-sealed air chamber for controlling flow therethrough, an air pipe from the air chamber of each outlet to the air chamber of the inlet of the same tank and having a liquid-sealed trap therein, a liquid-sealed air pipe leading from the outlet air chamber of each tank to the inlet air chamber of the other tank, and a vent for the liquid of the seal of each of said last named pipes.

28. In a device of the character described, two metering tanks, a source of liquid supply, conduits leading from said source respectively to each of said tanks and each having a liquid-sealed air chamber therein to control flow of liquid therethrough, an outlet for each of said tanks and having a liquid-sealed air chamber for controlling flow therethrough, an air pipe from the air chamber of each outlet of the air chamber of the inlet of the same tank and having a liquid-sealed trap therein, an air pipe leading from the air space of the outlet air chamber of each tank and open at its end and provided with a liquid-sealed trap, and a vent leading from a point below the normal liquid level of each of said traps and sealed by the liquid therein to the air space of the inlet air chamber of the other tank.

In testimony whereof, I have signed my name to this specification.

CHARLES S. BROWN.